US010445842B1

(12) United States Patent
Thompson

(10) Patent No.: US 10,445,842 B1
(45) Date of Patent: Oct. 15, 2019

(54) METHOD AND SYSTEM FOR ORDERING FOOD AND DRINK ITEMS AT A GOLF COURSE

(71) Applicant: I.I.L 3 LLC, Cooper City, FL (US)

(72) Inventor: John Thompson, Cooper City, FL (US)

(73) Assignee: I.I.L 3 LLC, Davie, FL (US)

( * ) Notice: Subject to any disclaimer, the term of this patent is extended or adjusted under 35 U.S.C. 154(b) by 0 days.

(21) Appl. No.: 16/120,192

(22) Filed: Aug. 31, 2018

(51) Int. Cl.
*G06Q 30/00* (2012.01)
*G06Q 50/12* (2012.01)
*G06Q 30/06* (2012.01)
*H04W 4/029* (2018.01)
*H04W 92/18* (2009.01)

(52) U.S. Cl.
CPC ......... *G06Q 50/12* (2013.01); *G06Q 30/0633* (2013.01); *H04W 4/029* (2018.02); *H04W 92/18* (2013.01)

(58) Field of Classification Search
CPC ..................................................... G06Q 30/00
USPC ............................................................ 705/15
See application file for complete search history.

(56) References Cited

U.S. PATENT DOCUMENTS

| | | |
|---|---|---|
| 2004/0196181 A1* | 10/2004 | Huston ................... G01S 19/19 342/357.25 |
| 2004/0210621 A1 | 10/2004 | Antonellis |
| 2004/0243262 A1 | 12/2004 | Hofmann |
| 2005/0228547 A1 | 10/2005 | McDonnell et al. |
| 2008/0108456 A1 | 5/2008 | Bonito |
| 2011/0191023 A1 | 8/2011 | Engstrom |
| 2012/0290444 A1 | 11/2012 | Nelson |
| 2016/0189287 A1 | 6/2016 | Van Meter |
| 2018/0247228 A1* | 8/2018 | Kattil Veetil .......... G06Q 10/02 |

* cited by examiner

*Primary Examiner* — Russell S Glass
(74) *Attorney, Agent, or Firm* — Mark C. Johnson; Johnson | Dalal

(57) ABSTRACT

A method and system for conducting food item transactions at a sporting facility through peer-to-peer communications between a mobile food consumer and a food provider. The method and system provides a peer-to-peer network that enables peer-to-peer communications between a food consumer traversing a sporting facility, such as a golf course, and a food provider. The food consumer carries a mobile communication device having: a tracking unit, a microphone, and a speaker. Through, peer-to-peer communications, the food consumer inquires about food items, the food provider responds to the inquiry, and the consumer orders a desired food item. The position and speed of motion of the food consumer on the sporting facility is tracked through a satellite communication or communication network operable with the tracking unit. The food provider delivers the food item to the tracked position of the food consumer.

14 Claims, 6 Drawing Sheets

400

METHOD AND SYSTEM FOR ORDERING FOOD AND DRINK ITEMS AT A GOLF COURSE

FIELD OF THE INVENTION

The present invention relates generally to a method and system for conducting food item transactions at a sporting facility through peer-to-peer communications between a mobile food consumer and a food provider, and, more particularly, relates to methods and systems for conducting peer-to-peer communications over a communication network between a mobile food consumer moving between holes on a golf course, and a food provider on a golf course, so as to transact food or beverage item purchases while also tracking the position of the mobile food consumer so that the food provider delivers the food item to a desired hole on the golf course.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, a peer-to-peer (P2P) network is created when two or more PCs are connected and share resources without going through a separate server computer. A P2P network can be an ad hoc connection—a couple of computers connected via a Universal Serial Bus to transfer files. A P2P network also can be a permanent infrastructure that links a half-dozen computers in a small office over copper wires. Or a P2P network can be a network on a much grander scale in which special protocols and applications set up direct relationships among users over the Internet.

It is known that peer-to-peer network architectures enable two terminals connected to a transmission network such as the Internet network to communicate with each other directly without passing through a central server that redistributes the data. In this architecture, each terminal is configured so as to act as both server and client.

Generally, golfers spend anywhere from an hour to several hours on the golf course for each golf outing. There is a need for food, beverages, and other supplies to be provided to the golfers while they are on the golf course. Golfers are willing to purchase retail items that they need for their golf game or that will make their golf game more enjoyable. Each golf course has one or more clubhouse(s) where supplies are sold, but the golfers usually have to leave the golf course to visit the clubhouse.

In many instances, retail buildings can be strategically placed on the golf course, but this is expensive and upsets the flow and design of a golf course. Further, golfers do not want to leave the golf course to obtain supplies, so it makes sense to provide a mobile unit that travels to the golfers on the golf course to provide supplies for them.

Other proposals have involved delivering food and golf related supplies on a golf course or sporting facility. The problem with these delivery methods is that they require use of menus and other expensive components that have to be spread across a sporting facility. Also, only one customer can be serviced at any one time. Also, the location of the customer can be difficult to track on a golf course. Even though the above cited sports facility delivery systems meet some of the needs of the market, a method and system for conducting food item transactions at a sporting facility through peer-to-peer communications between a mobile food consumer and a food provider is still desired.

Therefore, a need exists to overcome the problems with the prior art as discussed above.

SUMMARY OF THE INVENTION

The invention provides a method and system for conducting food item transactions at a sporting facility through peer-to-peer communications between a mobile food consumer and a food provider that overcomes the hereinafore-mentioned disadvantages of the heretofore-known devices and methods of this general type.

With the foregoing and other objects in view, there is provided, in accordance with the invention, a computer-implemented method and system for conducting food item transactions at a sporting facility through peer-to-peer communications between at least one mobile food consumer and a food provider. The food item order is requested and fulfilled through a peer-to-peer network. The position and speed of motion of the food consumer is tracked through a satellite communication or a communication network, such that the ordered food item is accurately delivered to the food consumer's position in the sporting facility.

In one non-limiting embodiment, the method and system enables peer-to-peer communications over a peer-to-peer communication network between a mobile food consumer playing between holes on a golf cart, and a food provider serving a food item on a golf course. The system and method allows for the transaction of food item purchases directly on the golf course while also tracking the position of the mobile food consumer between holes, so that the food provider delivers the food item to a desired hole on the golf course.

In accordance with another feature of the present invention, the method includes an initial Step of executing, by a mobile food consumer, a food ordering app on a mobile communications device, the mobile communications device including at least one of the following: a tracking unit to track the position of the mobile communication device; and a microphone to receive aural input and a speaker to generate aural output.

In accordance with another feature of the present invention, the method may also include a Step of providing a peer-to-peer network for communication between the mobile food consumer and a food provider. Another Step includes initiating a peer-to-peer communication between the mobile food consumer and a food provider. The method further includes a Step of initiating, by the mobile food consumer, a peer-to-peer communication with a food provider at a sporting facility.

In accordance with another feature of the present invention, the method may include a Step of responding, over the peer-to-peer network, by the food provider, about the inquired food item. Another Step comprises ordering, over the peer-to-peer network, by the food consumer, the food item. The method further includes a Step of determining, by the food provider, based at least in part on the tracking unit, a speed and position and speed of motion of the mobile communications device traversing the sporting facility. A final Step of the method comprises delivering, by the food provider, the food item to the food consumer at the tracked position of the food consumer on the sporting facility.

In accordance with yet another feature, an embodiment of the present invention further includes a Step of establishing a satellite communication or a communication network operable with the tracking unit to track the position of the mobile communication device at the sporting facility.

In accordance with yet another feature, an embodiment of the present invention further includes a Step of traversing, by the food consumer, through the sporting facility while ordering the food item.

In accordance with yet another feature, the mobile communication device further includes at least one of the following: a stand-alone voice communications system, an intercom, and a speaker.

In accordance with yet another feature, the peer-to-peer network comprises at least two equal peer nodes simultaneously functioning as both clients and servers to the other nodes on the peer-to-peer network.

In accordance with yet another feature, the sporting facility is a golf course.

In accordance with yet another feature, the food consumer is a golf player.

In accordance with yet another feature, the mobile communication device is a cellular telephone.

In accordance with yet another feature, the food provider is a cart girl or an employee of a golf course concession stand.

In accordance with yet another feature, the food item is a food, or a beverage, or both.

One objective of the present disclosure is to facilitate ordering and delivery of food items on a golf course.

Another objective is to enable immediate and direct communication between the food consumer and food provider about the food item without requiring the use of menus, digital displays, price lists, and other cumbersome components and features that add costs, time losses, and equipment to the system.

Another objective is to enable the food provider to communicate with two or more food consumers simultaneously to increase efficiency and profits.

Another objective is to integrate a tracking unit into the communication device of the food consumer for real time delivery of the food item at the food consumer's location on the sporting facility.

Another objective is to provide a delivery vehicle that has a visual display of the food consumer's location on the sporting facility.

Although the invention is illustrated and described herein as embodied in a simultaneous website and mobile app creation system and method, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. The terms "program," "food ordering application," and the like as used herein, are defined as a sequence of instructions designed for execution on a computer system. A "program," "computer program," or "food ordering application" may include a subroutine, a function, a procedure, an object method, an object implementation, an executable application, an applet, a servlet, a source code, an object code, a shared library/ dynamic load library and/or other sequence of instructions designed for execution on a computer system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
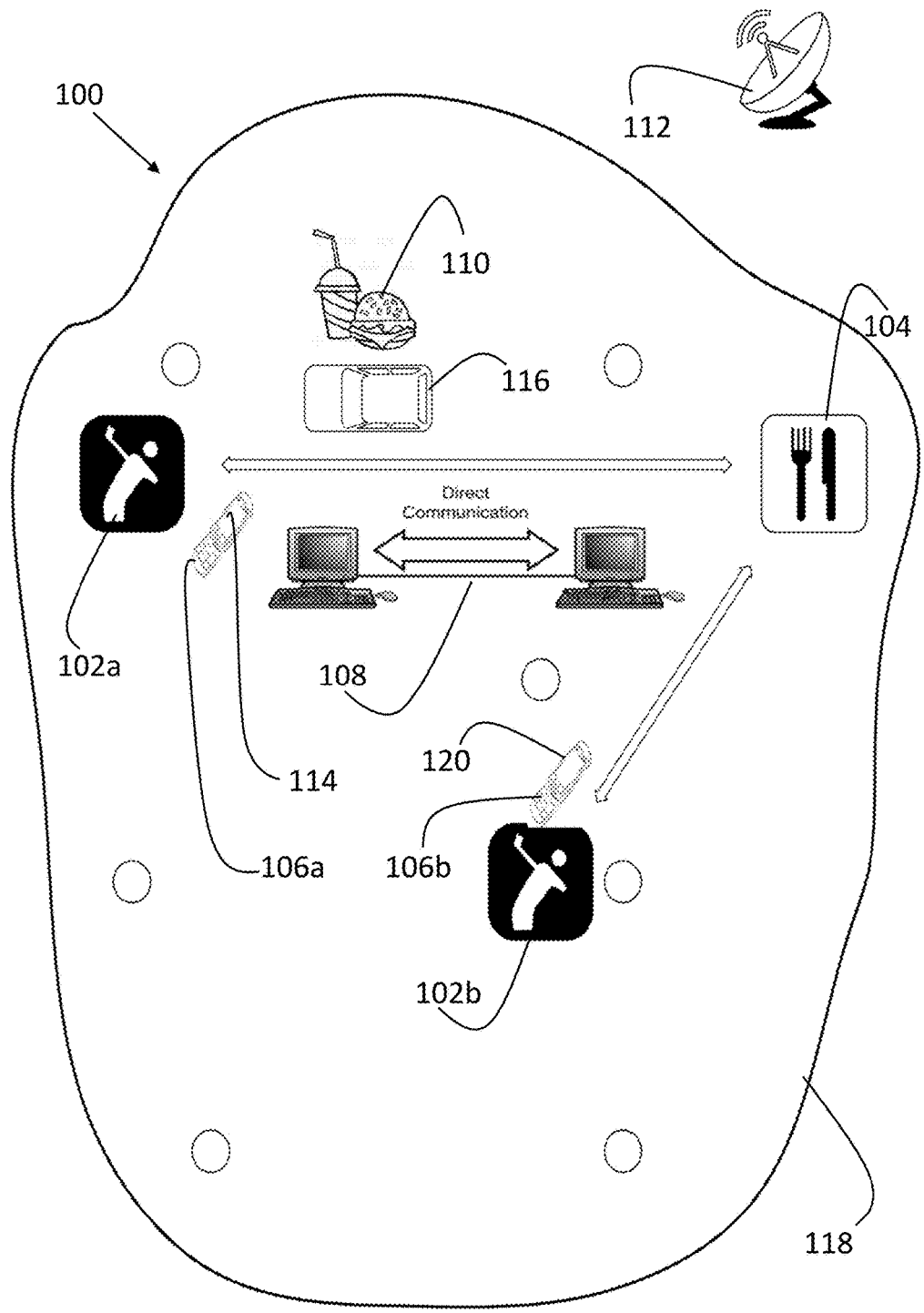
FIG. 1 is a block diagram view of an exemplary system for conducting food item transactions at a sporting facility through peer-to-peer communications between a mobile food consumer and a food provider, in accordance with an embodiment of the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient system 100 and method 200 for conducting food and/or beverage item transactions at a sporting facility through peer-to-peer communications between a mobile food consumer and a food provider. While the identifier "food" is employed before the terms "consumer," "provider," along with other terms, those of skill in the art will appreciate that said term shall not be limited to just food, as further described herein. Embodiments of the present invention provide for conducting food item 110 transactions at a sporting facility 118, particularly at a golf course, through peer-to-peer communications between at least one mobile food consumer 102a-g and a food provider 104, e.g., a cart person roaming the golf course. The food item 110 order is requested and fulfilled through a peer-to-peer network 108. The position and/or speed of motion of the food consumer 102a is tracked through, for example, a satellite communication or a communication network 108, such that the ordered food item 110 is accurately delivered to the food consumer's 102a position in the sporting facility 118. One such exemplary method of ascertaining the position of a user includes the detection system described in U.S. Pat. No. 5,952,959 (Norris), the entirety of which is incorporated herein by reference.

In addition, embodiments of the present invention include a mobile communications device 106a, 106b having a tracking unit 112 that is operable with a satellite communication or a communication network operable with the tracking unit 112 to track the position of the mobile communication device 106a, 106b—and thereby the food consumer 102a—at the sporting facility 118. Further embodiments of the present invention include providing a food ordering app that is downloaded onto the mobile communication device 106a-b for integrating into the peer-to-peer network 108, and initiating communications to conduct the food item 110 transaction.

Referring now to the system 100 in FIG. 1, one embodiment of the present invention is shown in a block diagram view. FIG. 1 shows several advantageous features of the present invention, but, as will be described below, the invention can be provided in several shapes, sizes, combinations of features and components, and varying numbers and functions of the components.

The system 100 particularly advantageous when operated at a golf course 118 where food and beverage items 110 are desired and purchased by consumers and sold by the golf course management. The golf course is known in the art to include a series of holes, each consisting of a teeing ground, a fairway, a rough, and a green with a flagstick and hole. Further, a standard round of golf consists of 18 holes that players sequentially move across, starting at the $1^{st}$ hole teeing ground, and ending at the final $18^{th}$ hole. The system 100 is operable to conduct food item 110 transactions on any of these holes, fairways, concession stand areas, or locker rooms, at or in proximity to the golf course.

However in other embodiments, the sporting facility 118 may include, without limitation, a putt-putt golf course, a polo horse field, a baseball field, a football field, a basketball stadium, a cricket field, a swimming pool area, a track and field, and a vehicle race track. Thus, food transactions can occur at any sporting facility 118 where it is desirable to consume while playing, observing, or serving in the sporting facility 118.

The system 100 further includes at least one food consumer 102a-g. The food consumer 102a is the party who orders and consumes the food item 110 at or near the sporting facility 118. The food consumer 102a may traverse the sporting facility 118 while ordering and consuming the food item 110. The food consumer 102a-g is the recipient of the food item 110, ordering the food item 110 through a direct, peer-to-peer communication with a food provider 104, as discussed below.

In some embodiments, the food consumer 102a-g may include a golf player on a golf course. The golf player may order the food item 110 from any point on the golf course for delivery to the hole, fairway, club house, or other point on the golf course where the food consumer 102a is at that moment. However, in other embodiments, the food consumer 102a-g may include an observer, i.e. fan, at the sporting facility 118. In yet other embodiments, the food consumer 102a-g may include, without limitation, a sports player, a spectator, a sporting facility staff member, a referee, or any other person or entity at or in proximity to the sporting facility 118.

The system 100 further includes a food provider 104 who prepares and/or delivers the food and/or beverage item 110 to the food consumer 102a. The food provider also communicates with the food consumer over the peer-to-peer network 108 regarding the food item 110. The food provider 104 positions at or near the sporting facility 118 for preparing, communicating, and delivering the food item 110 at or near the sporting facility 118.

In one embodiment, the food provider 104 receives a food order through peer-to-peer communication with the food consumer 102a-g, and then prepares and delivers the food item 110 at the precise location of the food consumer 102a-g, whether mobile, or stationary, on or near the sporting facility 118. For example, the food consumer 102a-g may order a food item 110 while playing golf at the $9^{th}$ hole of a golf course. The food provider 104 determines the location of the food consumer 102a to deliver the food item 110. The food provider prepares the food item 110. The food provider 104 delivers the food item to the $18^{th}$ hole, or in the golf course locker room, dependent on the food consumer's location. In some embodiments, the food provider 104 may include, without limitation, a cart girl, a cook, a bartender, a waiter, a busboy, a caterer, a sports arena vendor, a golf caddy, and a restaurant.

Looking again at FIG. 1, the food consumer 102a-g, or the food provider 104, or both 102a-g, 104 have a mobile communication device 106a, 106b to perform the communication and tracking functions of the present invention. In one embodiment, the mobile communication device 106a, 106b comprises a stand-alone voice communications system 100 or an intercom. In other embodiments, the mobile communication device 106a-b may include, without limitation, a cellular phone, a walkie-talkie, a tablet, and a laptop.

In yet another embodiment, the food consumer 102*a* may download a food ordering app onto the mobile communication device 106*a* to initiate the system 100. The food consumer 102*a* may also register and provide a login password to join the peer-to-peer network 108, and order food items 110, i.e., relay a food and/or beverage order to the food provider, preferably wherein no menu is utilized to ascertain what the consumer wants, thereby providing a more effective and efficient system and method adaptable to a variety of different courses without adapting to various menus. Various peer-to-peer communication platforms known in the art may also be used with the mobile communication device 106*a*.

In one non-limiting embodiment, the mobile communication device 106*a* includes a user input interface, a network interface, memory, a processing device, a display, an audio input/output, and a tracking unit 112, or location detection device known in the art. The user input interface functions to provide a user a method of providing input to the mobile communication device 106*a*. The user input interface may also facilitate interaction between the food consumer 102*a* and the mobile communication device 106*a*. In other embodiments, the user input interface may be a keypad providing a variety of user input operations. Keys, buttons, and/or keypads may be implemented as a touchscreen associated with the display.

In some embodiments, the mobile communication device 106*a*, 106*b* may have integrated therein a tracking unit 112 to track the position of the mobile communication device 106*a*, 106*b*; a microphone 120 to receive aural input; and a speaker 114 to generate aural output. Each of these components 112, 114, 120 help to establish peer-to-peer communications, and efficient delivery of the food item 110.

The tracking unit 112 helps the food provider 104 determine the location of the at least one food consumer 102*a* for accurate delivery thereto. Multiple food consumers 102*a*-*g* may be tracked simultaneously. Specifically, the tracking unit 112 is configured to track the food consumer 102*a*-*g* while traversing the sporting facility 118, and supply a timely ordered sequence of location data about the food consumer 102*a*-*g* for further processing. In one non-limiting embodiment, the tracking unit 112 may include a global positioning system 100. In this regards, a satellite communication or a communication network is operable with the tracking unit 112 to track the position of the mobile communication device 106*a*, 106*b*, and thereby the corresponding food consumer 102*a*, 102*b* at or near the sporting facility 118.

The speaker 114 and the microphone 120 help relay the aural communications by allowing the food consumer 102*a*-*g* to inquire about, and order the food item 110 from the food provider 104 through the peer-to-peer network 108, while traversing the sporting facility 118. Further, the speaker 114 and the microphone 120 allow the food consumer 102*a*-*g* and the food provider 104 to communicate the specifics of the food order, including the type of food item 110 that is available, the price of the food item 110, and the desired time to receive the food item 110.

Figure 2:
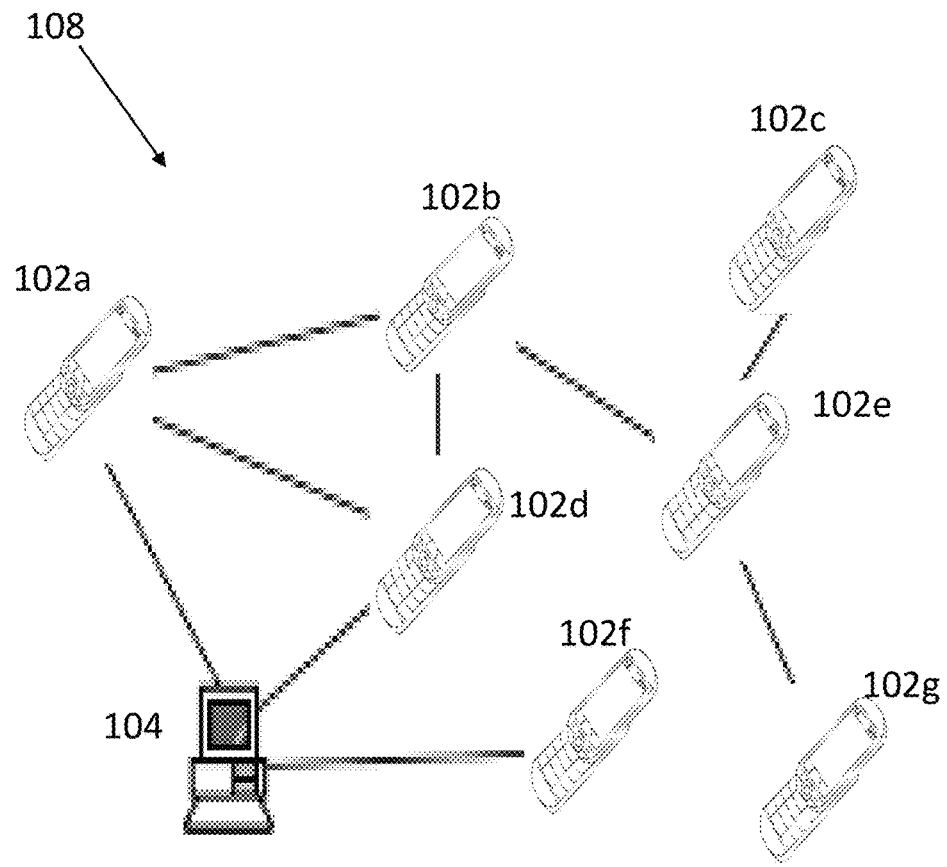
FIG. 2 is a block diagram view of an exemplary peer-to-peer network, in accordance with an embodiment of the present invention.

Turning now to the peer-to-peer architecture depiction in FIG. 2, the system 100 is unique in that the platform by which the food consumer 102*a*-*g* and the food provider 104 communicate is operated through direct peer-to-peer communications therebetween. A peer-to-peer network 108 enables direct, peer-to-peer communications between the food provider 104 and the at least one food consumer 102*a*-*g*. While FIG. 2 depicts a desktop computer as the food provider 104, in preferred embodiments, the food provider 104 also has a cellular phone who is logged in to the software application.

Thus, the food consumer 102*a*-*g* inquires, over the peer-to-peer network 108, about a food item 110 provided by the food provider 104. For example, "Do you have hamburgers? How much is a large soda drink? Can you deliver a club sandwich to me on the golf course by two o'clock p.m.?"

The food provider 104 then responds, over the peer-to-peer network 108, about the inquired food item 110. For example, "We have single burgers, double cheese burgers, and veggie burgers. A large soda drink is two dollars. We will deliver the club sandwich to the hole you will be playing at on the golf course at two o'clock p.m.; would you like Swiss or provolone cheese on club sandwich; and I am seeing you are presently on the fairway of the fifth hole."

Still utilizing the peer-to-peer network 108, the food consumer 102*a*-*g* orders the food item 110, based at least partially on the response from the food provider 104. For example, "Ok, I will take the club sandwich with Swiss cheese and a large soda drink at two o'clock p.m.; do you accept credit cards?" In this manner, a peer-to-peer communication occurs between the food consumer 102*a*-*g* and food provider 104. It is significant to note that there is no additional component, such as menus, or visual displays other than direct communications therebetween, which maintains costs and complexities at a minimum.

Utilizing a peer-to-peer network 108 in this manner, thus provides two significant advantages. Firstly, the food consumer 102*a* immediately communicates with the food provider 104, and vice versa, about the food item 110 without requiring the use of menus, digital displays, price lists, and other cumbersome components and features that add costs, time losses, and equipment to the system 100. It is significant to note that no menu is used in the system 100. Rather, the food consumer 102*a* and food provider 104 communicate directly to determine the food item 110 transaction.

A second advantage provided by the peer-to-peer network 108 is that the food provider 104 can take advantage of the peer-to-peer direct access to communicate with two or more food consumers 102*a*-*g* simultaneously. The peer-to-peer network 108 does not require the food provider 104 to terminate conversation with a first food consumer 102*a* to communicate with a second food consumer 102*b*, for example. In this manner, the food provider 104 can transact food item 110 transactions with more than one food consumer 102*a*-*g* at the same time; thus increasing efficiency and profits. FIG. 2 is intended as an example, and not as an architectural limitation for the present invention. Multiple food consumers 102*a*-*g* are referenced in communication with the single food provider 104.

FIG. 2 is intended as an example, and not as an architectural limitation for the present invention. In one non-limiting embodiment, the peer-to-peer network 108 comprises two processors, i.e., communication device 106*a*, 106*b*, cellular phone, tablet, personal computer, which are connected and share resources without going through a separate server computer. Though in other embodiments, the peer-to-peer network 108 may include an ad hoc connection, such as a couple of computers connected via a Universal Serial Bus to transfer files.

In the depicted example, the peer-to-peer network 108 can include the Internet, which represents a worldwide collection of network 108 and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. The peer-to-peer network 108 also may be implemented as a number of different types of networks, such as for example, an Intranet, a local area network 108 (LAN), or a wide area network 108 (WAN).

Upon receiving the food order, the food provider 104 prepares the food item 110 and determines the position of the food consumer 102a-g. Examples of "preparation" of the food item may include ascertaining whether the requested food and/or beverage item is available on the mobile vehicle of the food provider 104 and/or warming and/or making the food and/or beverage item. A food item 110 delivery vehicle 116 may be used by the food provider 104 for delivering the food item 110 to the food consumer 102a-g at the tracked position of the food consumer 102a-g on the sporting facility 118. In one embodiment, a digital display indicates which hole or position on the golf course the food consumer 102a is located to provide accurate delivery thereto. After determining the food consumer's 104a location, the food provider 104 may then drive a golf cart to deliver the food item 110 to the food consumer 102a-g, and receive subsequent payment.

Figure 3:
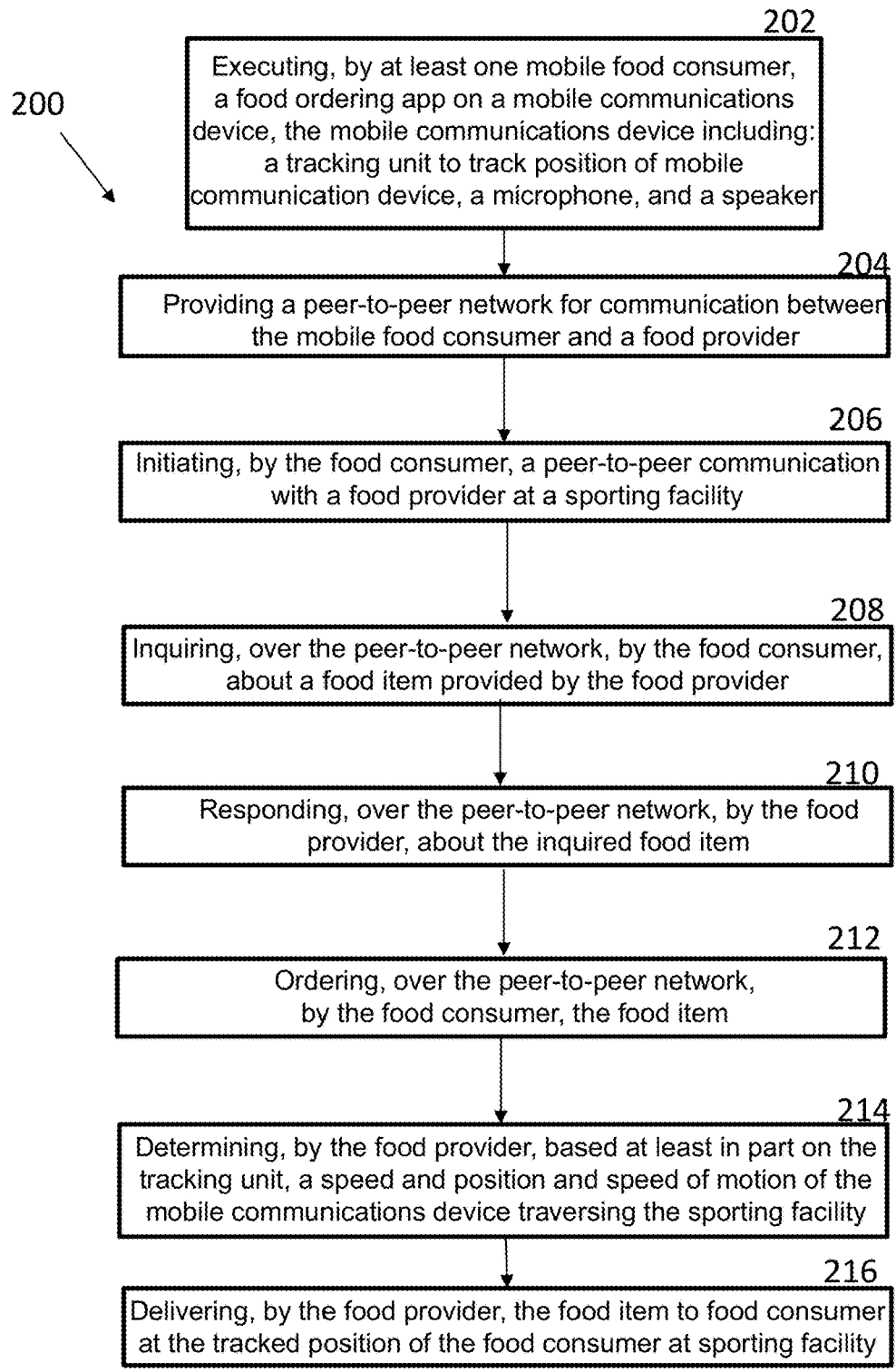
FIG. 3 is a process flow chart representing an exemplary method for conducting food item transactions at a sporting facility through peer-to-peer communications between a mobile food consumer and a food provider, in accordance with the present invention.

FIG. 3 illustrates a process flow chart representing an exemplary method 200 for conducting food item 110 transactions at a sporting facility 118 through peer-to-peer communications between a mobile food consumer 102a-g and a food provider 104. The method 200 provides a peer-to-peer network 108 that enables peer-to-peer communications between a food consumer 102a-g traversing a sporting facility 118, such as a golf course, and a food provider 104. The food consumer 102a-g carries a mobile communication device 106a having: a tracking unit 112, a microphone 120, and a speaker 114.

Through, peer-to-peer communications over the mobile communication device 106a, the food consumer 102a-g inquires about one or more food items 110, the food provider 104 responds to the inquiry, and the consumer orders a desired food item 110. The position and speed of motion of the food consumer 102a-g on the sporting facility 118 is tracked through a satellite communication or communication network operable with the tracking unit 112. The food provider 104 delivers the food item 110 to the tracked position of the food consumer 102a-g.

The method 200 includes an initial Step 202 of executing, by a mobile food consumer 102a-g, a food ordering app on a mobile communications device 106a-b, the mobile communications device including at least one of the following: a tracking unit 112 to track the position of the mobile communication device 106a, 106b; a microphone 120 to receive aural input; and a speaker 114 to generate aural output. In other embodiments, the method 200 may also include a Step 204 of providing a peer-to-peer network 108 for communication between the mobile food consumer 102a-g and a food provider 104. In one embodiment, one of a collection of P2P networks 108 may be ascertained and/or established by having the mobile food consumer 102a-g and a food provider 104 log into a database stored on a server and identifying themselves with a particular golf course identifier associated with one of a plurality of golf courses. In another advantageous embodiment, the one of a collection of P2P networks 108 may be ascertained and/or established by employing geo-fencing protocols in a wireless location system, whereby the app will identify the location of the mobile food consumer 102a-g and food provider 104 utilizing pre-defined geo-fences. One exemplary geo-fencing protocol may include that in which is described in Ward et al., U.S. Pat. No. 8,320,931 (Ward et al.), which is incorporated herein by reference.

Another Step 206 includes initiating a peer-to-peer communication between the mobile food consumer 102a-g and a food provider 104. The method 200 further includes a Step 208 of initiating, by the mobile food consumer 102a, a peer-to-peer communication with a food provider 104 at a sporting facility 118. An alternative Step in the method 200 may include traversing, by the food consumer 102a, through the sporting facility 118 while ordering the food item 110. Traversing the sporting facility 118 includes playing through an $18^{th}$ hole golf course while initiating the peer-to-peer communication, and subsequently ordering the food item 110.

In yet other embodiments, the method 200 may include a Step 210 of responding, over the peer-to-peer network 108, by the food provider 104, about the inquired food item 110. Another Step 212 comprises ordering, over the peer-to-peer network 108, by the food consumer 102a, the food item 110. One alternative embodiment of the method 200 may include establishing a satellite communication or a communication network operable with the tracking unit 112 to track the position of the mobile communication device 106a at the golf course.

The method 200 may then provide a Step 214 of determining, by the food provider 104, based at least in part on the tracking unit 112, a speed and position and speed of motion of the mobile communications device traversing the sporting facility 118. A final Step 216 of the method 200 comprises delivering, by the food provider 104, the food item 110 to the food consumer 102a at the tracked position of the food consumer 102a on the sporting facility 118. A food item 110 delivery vehicle 116 may be used by the food provider 104 for delivering the food item 110 to the food consumer 102a at the tracked position of the food consumer 102a on the sporting facility 118. In one embodiment, a digital display indicates which hole or position of the food consumer 102a. The food provider 104 may then drive a golf cart to deliver the food item 110 to the food consumer 102a-g, and receive subsequent payment.

A novel and efficient system 100 and method 200 has been disclosed for conducting food item transactions at a sporting facility through peer-to-peer communications between a mobile food consumer and a food provider. Embodiments of the present invention provide for such peer-to-peer communication uses are accomplished in direct, talks between food consumer and food provider at the sporting facility. In addition, embodiments of the present invention include a tracking unit in the communication device of the food consumer that allows the food provider to determine the location of the food consumer for delivery of the food item. Further embodiments of the present invention include real time tracking of the food consumer and efficient delivery of the food item at a specified time and deciphered location on the sporting facility.

Figure 4:
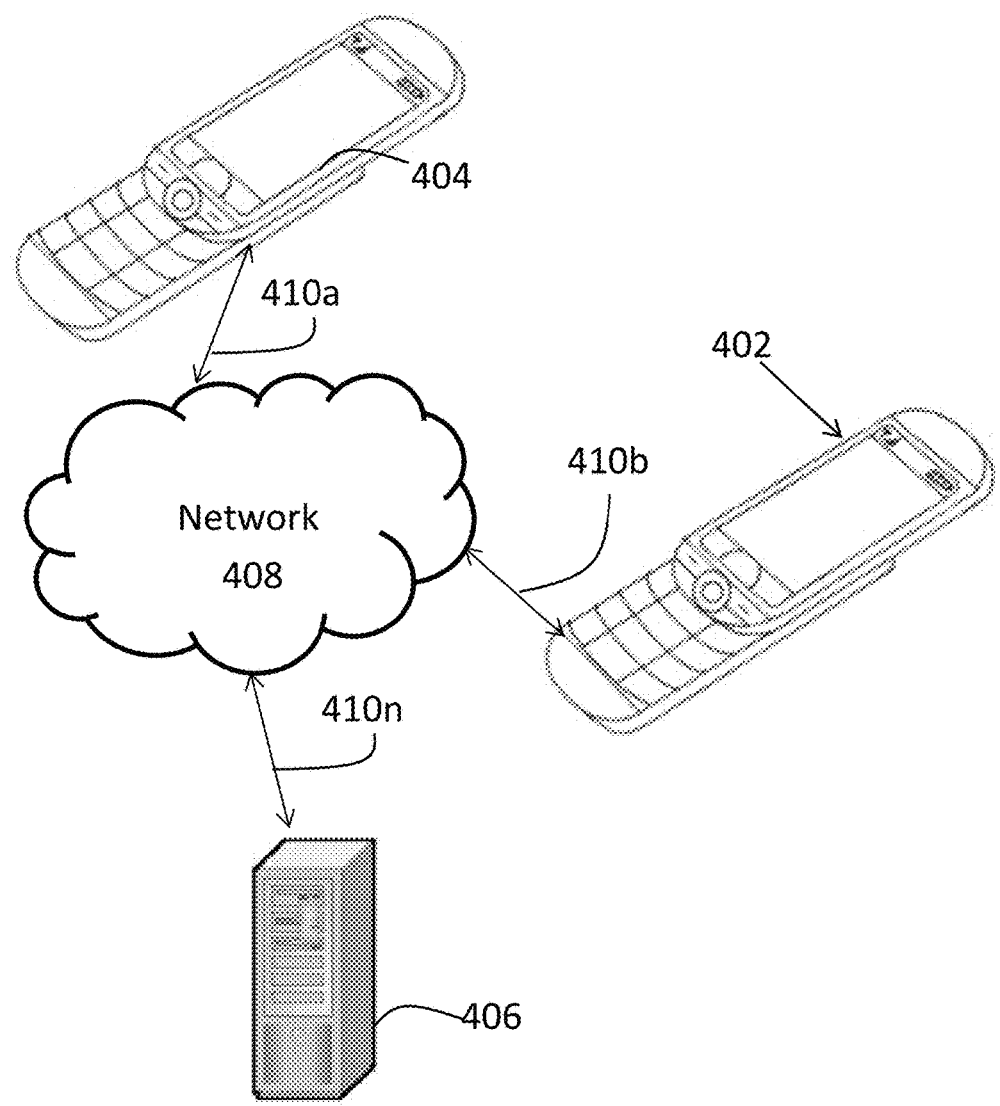
FIG. 4 is a block diagram view of an exemplary distributed data processing network with a mobile electronic device, a personal computer, and a server, in accordance with an embodiment of the present invention.

Referring now to FIG. 4, one embodiment of the present invention is shown in a block diagram view. FIG. 4 shows several advantageous features of the present invention, but, as will be described below, the invention can be provided in several shapes, sizes, combinations of features and components, and varying numbers and functions of the components. The first example of a system 100 and method 200 has been disclosed for conducting food item transactions at a sporting facility through peer-to-peer communications between a mobile food consumer and a food provider, as shown in FIG. 4, includes, as described above, a mobile electronic device 402, a food provider 404, and at least one server 406, communicatively coupled over at least one network 408.

Network

The system 400 includes connections 410a-n, which are the medium used to provide communications links between various devices and computers connected together within the system 400. The connections 410a-n may be wired or wireless connections. A few exemplary wired connections are cable, phone line, and fiber optic. Exemplary wireless connections include radio frequency (RF) and infrared radiation (IR) transmission. Many other wired and wireless connections are known in the art and can be used with the present invention.

In the depicted example, the network 408 can include the Internet, which represents a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network 408 also may be implemented as a number of different types of networks, such as for example, an Intranet, a local area network (LAN), or a wide area network (WAN). FIG. 4 is intended as an example, and not as an architectural limitation for the present invention. The system 400 and/or the network 408 may include additional servers and other devices and entities not shown.

Hardware

Figure 5:
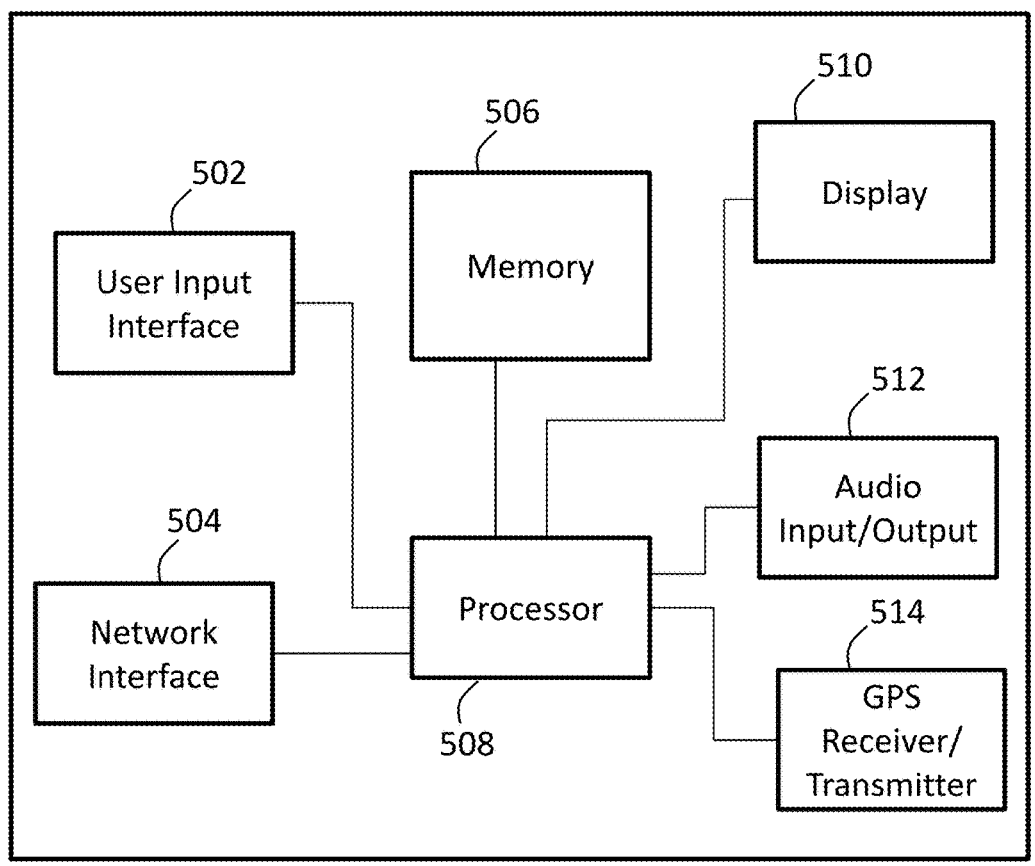
FIG. 5 is a block diagram view of an exemplary mobile electronic device, in accordance with an embodiment of the present invention.

Referring now to FIG. 5, an exemplary electronic mobile device 500 is illustrated in a block diagram. The exemplary electronic mobile device 500 may be considered an example implementation of the mobile electronic devices 402, 404 depicted in the block diagram of FIG. 4. In another embodiment, the electronic mobile device 500 may be considered an example implementation of other devices and components within the system 400 depicted in FIG. 4 or FIG. 1.

The exemplary electronic mobile device 500 includes a user input interface 502, a network interface 504, memory 506, a processing device 508, a display 510, an audio input/output 512, and a location detection device 514.

The user input interface 502 functions to provide a user a method of providing input to the electronic mobile device 500. The user input interface 502 may also facilitate interaction between the user and the device 500. The user input interface 502 may be a keypad providing a variety of user input operations. For example, the keypad may include alphanumeric keys for allowing entry of alphanumeric information (e.g. telephone numbers, contact information, text, etc.). The user input interface 502 may include special function keys (e.g. a camera shutter button, volume control buttons, back buttons, home button, etc.), navigation and select keys, a pointing device, and the like. Keys, buttons, and/or keypads may be implemented as a touchscreen associated with the display 510. The touchscreen may also provide output or feedback to the user, such as haptic feedback or orientation adjustments of the keypad according to sensor signals received by motion detectors, such as an accelerometer, located within the device 500. The user input interface 502 may allow a consumer to place his or her order with the food provider.

The network interfaces 504 may include one or more network interface cards (NIC) or a network controller. In some embodiments, the network interface 504 may include a personal area network (PAN) interface. The PAN interface may provide the capability for the electronic mobile device 500 to network using a short-range communication protocol, for example, a Bluetooth communication protocol. The PAN interface may permit one electronic mobile device 500 to connect wirelessly to another electronic mobile device 500 via a peer-to-peer connection.

The network interfaces 504 may also include a local area network (LAN) interface. The LAN interface may be, for example, an interface to a wireless LAN, such as a Wi-Fi network. In one embodiment, there is a wireless LAN that provides the electronic mobile device 500 with access to the Internet for receiving and sending inputs/messages to the server 406, over the Internet. The range of the LAN interface may generally exceed the range available via the PAN interface. Typically, a connection between two electronic devices via the LAN interface may involve communication through a network router or other intermediary device.

Additionally, the network interfaces 504 may include the capability to connect to a wide area network (WAN) via a WAN interface. The WAN interface may permit a connection to a cellular mobile communications network. The WAN interface may include communications circuitry, such as an antenna coupled to a radio circuit having a transceiver for transmitting and receiving radio signals via the antenna. The radio circuit may be configured to operate in a mobile communications network, including but not limited to global systems for mobile communications (GSM), code division multiple access (CDMA), wideband CDMA (WCDMA), and the like.

Memory 506 associated with the device 500 may be, for example, one or more buffer, a flash memory, or non-volatile memory, such as random access memory (RAM). The electronic mobile device 500 may also include non-volatile storage. The non-volatile storage may represent any suitable storage medium, such as a hard disk drive or non-volatile memory, such as flash memory.

The processing device 508 can be, for example, a central processing unit (CPU), a microcontroller, or a microprocessing device, including a "general purpose" microprocessing device or a special purpose microprocessing device. The processing device 508 executes code stored in memory 506 in order to carry out operation/instructions of the electronic mobile device 500. The processing device 508 may provide the processing capability to execute the P2P network described above.

The display 510 displays information to the user such as an operating state, time, telephone numbers, various menus, application icons, pull-down menus, and the like. The display 510 may be used to present various images, text, graphics, or videos to the user, such as photographs, mobile television content, Internet webpages, and mobile application interfaces. The display 510 may be any type of suitable display, such as a liquid-crystal display (LCD), a plasma display, a light-emitting diode (LED) display, or the like.

The electronic mobile device 500 may include audio input and output structures 512, such as a microphone for receiving audio signals from a user and/or a speaker for outputting audio data, such as audio alerts, songs, ringtones, video tracks, voice data received by the electronic mobile device 500 over a cellular network, and the like. The electronic mobile device 500 may also include an audio port for connection to peripheral audio input and output structures, such as a headset, or peripheral speakers or microphones.

The location detection device 514 may be associated with a global positioning system (GPS) or other location sensing technologies. The electronic mobile device 500 may have a GPS receiver or the like, to determine the location of the electronic mobile device 500. Such GPS location information of the electronic mobile device 500 may be useful for ascertaining position of a consumer and/or food provider.

Figure 6:
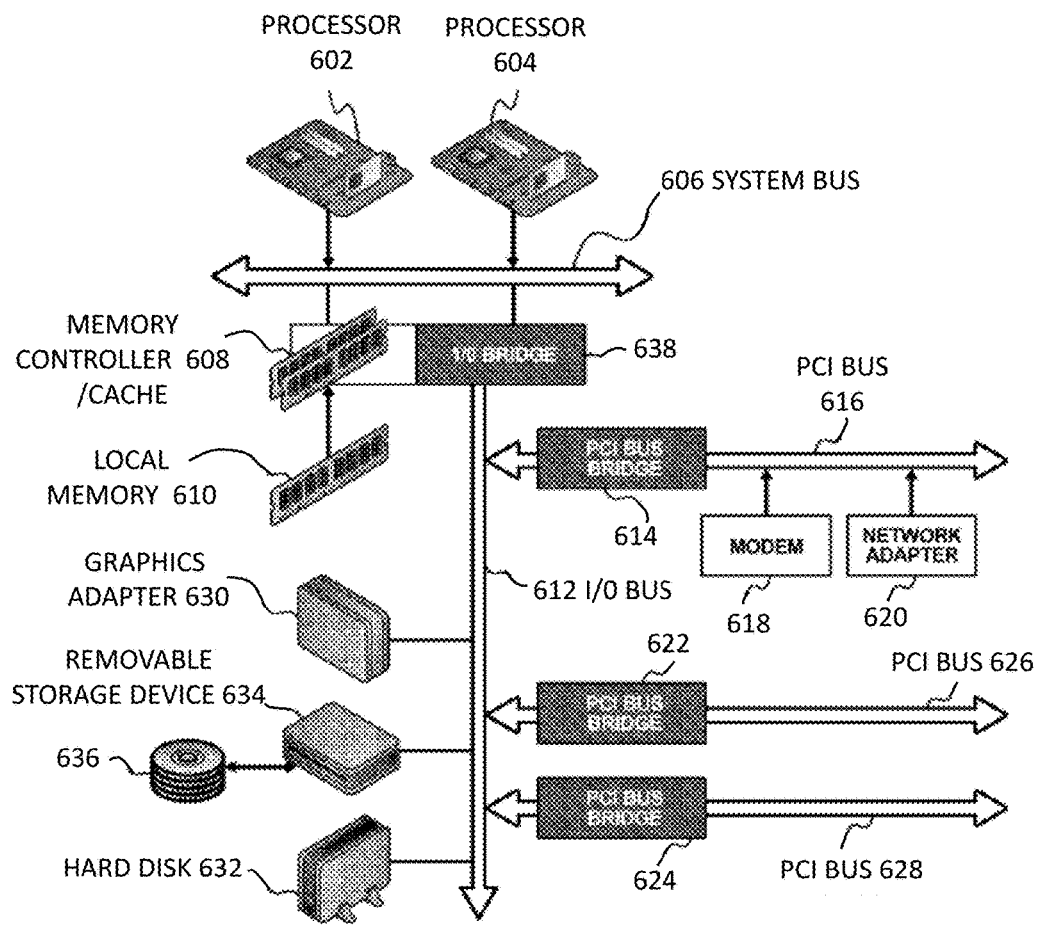
FIG. 6 is a block diagram view of a data processing system that may be implemented as a network device, in accordance with an embodiment of the present invention.

Referring to FIG. 6, a block diagram of a data processing system 600 that may be implemented as a server, such as the personal computer 404 or server 406, or implemented as a mobile electronic device, recording device, or other computing device coupled to the network 408, as shown in FIG. 4, in accordance with one embodiment of the present invention.

The data processing system 600 may be a symmetric multiprocessor (SMP) system including a plurality of processors 602 and 604 connected to system bus 606. Alternatively, a single processor system may be employed. Also, connected to system bus 606 is memory controller/cache 608, which provides an interface to local memory 610. An I/O bus bridge 638 is connected to system bus 606 and provides an interface to I/O bus 612. The memory controller/cache 608 and I/O bus bridge 638 may be integrated as depicted. The processor 602 or 604 in conjunction with memory controller 608 controls what data is stored in memory 610. The processor 602 and/or 604 and memory controller 608 can serve as a data counter for counting the rate of data flow to the memory 610 or from the memory 610 and can also count the total volume of data accessed to or from the memory 610. The processor 602 or 604 can also work in conjunction with any other memory device or storage location.

Peripheral component interconnect (PCI) bus bridge 614 connected to I/O bus 612 provides an interface to PCI local bus 616. A number of modems 618, or wireless cards, may be connected to PCI bus 616. Typical PCI bus implementations will support four PCI expansion slots or add-in connectors. PCI includes, but is not necessarily limited to, PCI-X and PCI Express components. Communications links to the network of computers in FIGS. 4 and 5 may be provided through the modem 618 and network adapter 620 connected to PCI local bus 616 through add-in boards.

Additional PCI bus bridges 622 and 624 provide interfaces for additional PCI buses 626 and 628, from which additional modems or network adapters may be supported. In this manner, the data processing system 600 allows connections to a multiple network of computers. A graphics adapter 630 and hard disk 632 may also be connected to I/O bus 612 as depicted, either directly or indirectly.

Those of ordinary skill in the art will appreciate that the hardware depicted in FIG. 6 may vary. For example, other peripheral devices, such as optical disk drives and the like, also may be used in addition to or in place of the hardware depicted. The depicted example is not meant to imply architectural limitations with respect to the present invention.

The processes explained in detail below can be embodied in a computer program. Computer programs (also called computer control logic) are stored in memory such as main memory 610, removable storage drive 634, removable media 636, hard disk 632, and signals. Such computer programs, when executed, enable the computer system to perform the features of the present invention as discussed herein. In particular, the computer programs, when executed, cause the processor 602 and/or 604 to perform the features of the simultaneous website and mobile app creation system 400.

In this document, the terms "computer program medium," "computer usable medium," and "computer readable medium" are used to generally refer to media such as main memory 610, removable storage drive 634, removable media 636, hard disk 632, and signals. These computer program products are means for providing software to the computer system. The computer readable medium allows the computer system to read data, instructions, messages or message packets, and other computer readable information from the computer readable medium. The computer readable medium, for example, may include non-volatile (non-transitory) memory, such as Floppy, ROM, Flash memory, Disk drive memory, CD-ROM, and other permanent storage. It is useful, for example, for transporting information, such as data and computer/programming instructions, between computer systems. Furthermore, the computer readable medium may comprise computer readable information in a transitory state medium such as a network link and/or a network interface, including a wired or wireless network, that allows a computer to read such computer readable information.

Although the invention is illustrated and described herein as embodied in a Method and System for Conducting Food Item Transactions at a Sporting Facility through Peer-To-Peer Communications between a Mobile Food Consumer and a Food Provider, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

What is claimed is:

1. A computer-implemented method for conducting food item transactions at a sporting facility through peer-to-peer communications between a mobile food consumer and a food provider, the method comprising:

downloading and installing, on a mobile communications device that is a cellular telephone of at least one food consumer, a food ordering app thereon, the cellular telephone of at least one food consumer having a user interface;

downloading and installing, on a communications device of a food provider, the food ordering app thereon;

executing, by the at least one food consumer, the food ordering app on the mobile communications device that is the cellular telephone of the at least one food consumer, the mobile communications device including a tracking unit to track the position of the mobile communication device of the at least one food consumer;

providing a peer-to-peer network for communication between the food consumer and the food provider;

initiating, by the food consumer and through the cellular telephone of the at least one food consumer, a peer-to-peer communication with the communications device of the food provider at a sporting facility;

inquiring, over the peer-to-peer network and without having a visual and digital display of a menu of the food provider on the user interface of the cellular telephone of the at least one food consumer, by the food consumer, about a food item provided by the food provider;

responding, over the peer-to-peer network, by the food provider, about the inquired food item;

ordering, over the peer-to-peer network and without having the visual and digital display of the menu of the food provider on the user interface of the cellular telephone of the at least one food consumer, by the food consumer, the food item;

determining, by the food provider, based at least in part on the tracking unit, a speed and position and speed of motion of the mobile communications device that is the cellular telephone of the at least one food consumer traversing the sporting facility; and delivering, by the food provider, the food item to the food consumer at the tracked position of the food consumer on the sporting facility.

2. The method in accordance with claim 1, wherein the steps for conducting food item transactions further includes:
establishing a satellite communication or a communication network operable with the tracking unit to track the position of the mobile communication device at the sporting facility.

3. The method in accordance with claim 1, wherein the steps for conducting food item transactions further includes:
traversing, by the food consumer, through the sporting facility while ordering the food item.

4. The method in accordance with claim 1, wherein:
the peer-to-peer network comprises at least two equal peer nodes simultaneously functioning as both clients and servers to other nodes on the peer-to-peer network.

5. The method in accordance with claim 1, wherein:
the sporting facility is a golf course.

6. The method in accordance with claim 5, wherein:
the food consumer is a golf player.

7. The method in accordance with claim 6, wherein:
the food provider is a cart girl or an employee of a golf course concession stand.

8. The method in accordance with claim 7, wherein:
the food item is a food, or a beverage, or both.

9. A computer-implemented method for conducting food item transactions at a golf course through peer-to-peer communications between a mobile food consumer and a food provider, the method consisting of:
downloading and installing, on a mobile communications device that is a cellular telephone of at least one food consumer, a food ordering app thereon, the cellular telephone of at least one food consumer having a user interface;
downloading and installing, on a communications device of a food provider, the food ordering app thereon;
executing, by the at least one food consumer, the food ordering app on the mobile communications device that is the cellular telephone of the at least one food consumer, the mobile communications device including at least one of the following: a tracking unit to track the position of the mobile communication device of the at least one food consumer, a microphone to receive aural input, and a speaker to generate aural output;
providing a peer-to-peer network for communication between the food consumer and a food provider;
initiating, by the food consumer and through the cellular telephone of the at least one food consumer, a peer-to-peer communication with the communications device of the food provider at a golf course;
inquiring, over the peer-to-peer network and without having a visual and digital display of a menu of the food provider on the user interface of the cellular telephone of the at least one food consumer, by the food consumer, about a food item provided by the food provider;
responding, over the peer-to-peer network, by the food provider, about the inquired food item;
ordering, over the peer-to-peer network and without having the visual and digital display of the menu of the food provider on the user interface of the cellular telephone of the at least one food consumer, by the food consumer, the food item;
establishing a satellite communication or a communication network operable with the tracking unit to track the position of the mobile communication device of the at least one food consumer at the golf course;
determining, by the food provider, based at least in part on the tracking unit, a speed and position and speed of motion of the mobile communications device that is the cellular telephone of the at least one food consumer traversing the golf course; and
delivering, by the food provider, the food item to the food consumer at the tracked position of the food consumer on the golf course.

10. The method in accordance with claim 9, wherein the steps for conducting food item transactions further includes:
traversing, by the food consumer, through the golf course while ordering the food item.

11. The method in accordance with claim 9, wherein:
the peer-to-peer network comprises at least two equal peer nodes simultaneously functioning as both clients and servers to other nodes on the peer-to-peer network.

12. The method in accordance with claim 9, wherein:
the food consumer is a golf player.

13. The method in accordance with claim 12, wherein:
the food provider is a cart girl or an employee of a golf course concession stand.

14. The method in accordance with claim 13, wherein:
the food item is a food, or a beverage, or both.

\* \* \* \* \*